Dec. 14, 1954 M. R. FOX 2,696,668
COMPOSITE TRAY FOR DENTURE IMPRESSIONS
Filed May 8, 1953
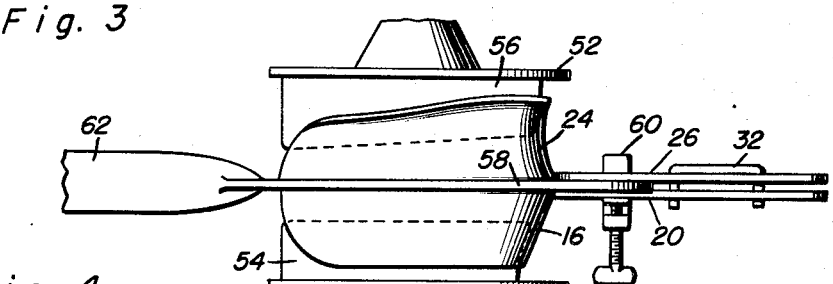
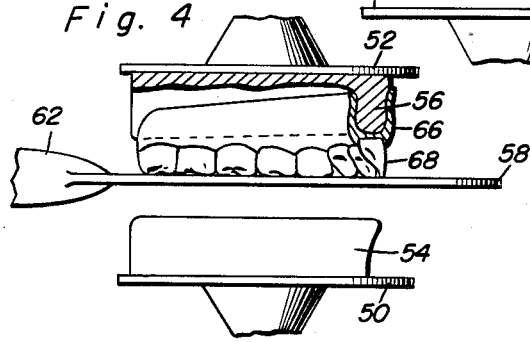
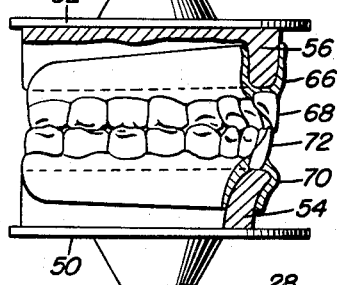
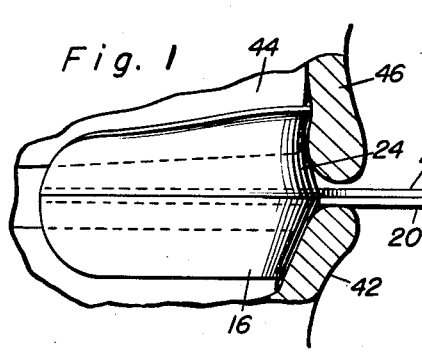
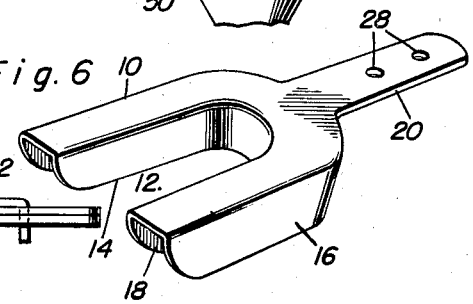
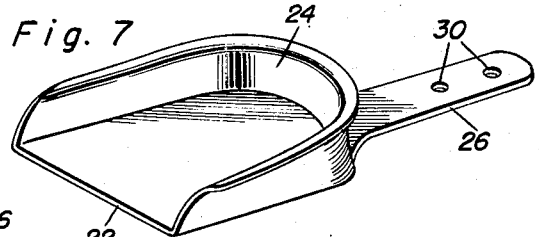
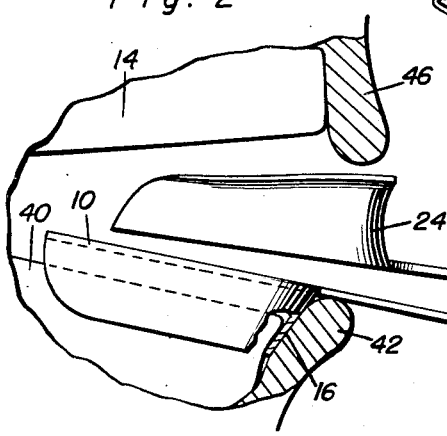
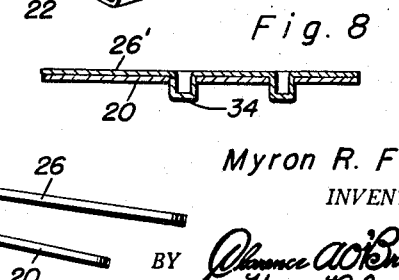
Myron R. Fox
INVENTOR.
BY Clarence A. O'Brien
and Harvey B. Jacobson
Attorneys

United States Patent Office 2,696,668
Patented Dec. 14, 1954

2,696,668

COMPOSITE TRAY FOR DENTURE IMPRESSIONS

Myron R. Fox, Brookville, Ohio

Application May 8, 1953, Serial No. 353,867

1 Claim. (Cl. 32—19)

This invention relates to a composite denture impression tray and particularly to a tray for so orienting the upper and lower impressions that the molds and the teeth constructed thereon will be arranged in a proper meeting arrangement so that the artificial teeth will meet in a proper alignment in the patient's mouth.

In constructing artificial teeth, it has heretofore been customary to take independent impressions of the upper and lower gums, and to mold models from these impressions on which artificial teeth and gums are constructed. It is a common fault of these dentures that the teeth constructed thereon do not meet in a common horizontal plane. This is generally due to the center line of the patient's mouth not coinciding with the center line of the patient's head, and the center of the patient's upper mouth or gums not coinciding with the center line of the lower mouth or gums, and consequently, the false center line is conveyed to the artificial dentures because of the heretofore known technique of taking the upper or lower impressions separately, which establishes the center line of that particular part of the mouth or gums without reference to any other portion of the mouth or gums.

The present invention provides means for orienting the upper and lower impressions with respect to each other so that the teeth constructed on the mold will be in proper arrangement and in alignment with each other so that the center lines of the upper and lower portion of the mouth will coincide so that the teeth will meet in a natural, substantially horizontal plane.

The construction according to the invention comprises a composite tray having upper and lower tray portions, each adapted to receive impression receiving material so that impressions may be simultaneously made in the upper and lower trays, and the trays having flat surfaces and means for retaining the trays in a predetermined relation to each other so that the impressions may be mounted on a dental articulator and manipulated to bring the upper and lower models into proper alignment with each other so that the teeth constructed thereon will be properly proportioned to the center lines of the patient's head and mouth and allow the teeth to meet in a proper occlusal plane.

It is accordingly an object of the invention to provide an improved denture impression plate.

It is a further object of the invention to provide a composite tray of upper and lower parts that can be placed into the mouth of a patient one at a time and locked together until the impression is made.

It is a further object of the invention to provide a composite denture tray which may be placed into or taken out of the mouth in separate sections.

It is a further object of the invention to provide means of locking upper and lower dental trays in proper location with respect to each other and the patient's mouth.

It is a further object of the invention to provide a composite tray which will mechanically assume the proper occlusal plane in the patient's mouth.

It is a further object of the invention to provide a composite tray which will transfer the proper occlusal plane to the dental articulator.

It is a further object of the invention to provide a composite tray which may be placed into or taken out of the patient's mouth in independent sections and relocated outside of the mouth in the same position that they occupied in the patient's mouth.

Other objects and many of the attendant advantages of the present invention will be apparent from the following detailed description taken in conjunction with the accompanying drawing, in which:

Figure 1 is an elevational view of the composite denture impression tray in position to receive an impression;

Figure 2 is a similar view showing the manner of removing the impression;

Figure 3 is a view of the impression trays mounted on a modeling stand;

Figure 4 is a view partially in section showing the formation of a denture on a model in cooperation with the occlusal plate of an articulating stand;

Figure 5 shows the manner of establishing the completed denture;

Figure 6 is a perspective view of the lower section of the composite impression tray;

Figure 7 is a perspective view of the upper section of the impression tray; and

Figure 8 is a sectional view showing a modified securing means for the tray sections.

In the exemplification according to the invention, the composite articulator impression tray comprises a lower tray portion 10 which is substantially a flat U-shaped plate of the proper size to fit over the lower gums in a patient's mouth and having a central aperture 12 for receiving the tongue of a patient. An inner depending rim 14 extends around the inner edge of the U-shaped plate 10 and is adapted to fit between the patient's lower gum and the tongue while an external rim 16 also depends from the plate 10 and extends around the outer periphery thereof so that the rim 16 will extend between the lower gum of the patient and the lips and cheeks to provide a channel 18 in which a denture impression material, such as wax, may be placed, so that the entire plate may be placed over the patient's lower gum and pressed thereon to receive an impression of the lower gum. A portion of the tray 10 extends outwardly to provide an extension 20 substantially in the plane of the U-shaped portion 10 for purposes presently to be described.

The upper portion of the composite tray comprises a flat plate 22 of substantially the proper shape to fit within the patient's mouth and having an upstanding rim 24 around the outer edge thereof and adapted to extend between the patient's upper gum and the lips and cheeks of the patient, the flat plate 22 being designed to be placed on and firmly received by the plate 10 so that the two flat plates are in contact and substantially firmly related to each other. The plate 22 is provided with a flat extension 26 which corresponds in shape and size to the extension 20 of the lower plate and preferably the extension 20 is provided with a plurality of apertures 28 and the extension 26 is provided with a plurality of apertures 30 which coincide with each other so that a U-shaped pin member 32 may extend through the apertures 30 and 28 to secure the plates 10 and 22 in a predetermined fixed relation to each other. The pins 32 may either be independent members which may be dropped into position as desired, or if desired, may be welded or otherwise secured to the extension 26 so that they will always be in position to allow the extensions 20 and 25 to be locked in position.

Instead of providing a U-shaped pin 32, one of the members, such as the plate 26' may be provided with pressed down depressions or key members 34 adapted to pass through the apertures 28 of the lower plate 20.

In the utilization of the composite tray according to the invention, the lower plate 10 will be placed into a patient's mouth so that the rims 16 and 14 will fit over the lower gum 40 while the depending rim 16 will extend between the gum 40 and the lower lip 42 of the patient so that the lip will not interfere with the impression material which will be retained on the plate 10 so that the gum 40 may be pressed into the impression material to create the proper impression therein.

Preferably, the lower plate will be placed in position on the gum after which the top plate 22 will be slid between the lower plate 10 and the upper gum 44 of the patient so that the rim 24 may be placed between the gum 44 and the upper lip 46 of the patient. The pin 32 will then be placed in position so that the plates will be rigidly locked together, after which the gums may be pressed into the impression receiving material to properly apply an impression therein, after which the pin 32 may be removed and the sections removed either together or one at a time from the patient's mouth.

Preferably, originally the plates 10 and 22 are used independently to secure independent impressions of the upper and lower gums, because since the pressure of the denture impression material will cause the plates to align with the proper occlusal plane in the mouth, the upper and lower impressions may be taken independently, after which the upper and lower impressions will be independently applied and articulator plates 50 and 52 and models 54 and 56 of the upper and lower gums made thereon, which will be substantially identical with the upper and lower gums of the patient's mouth, after which the denture impression trays will both be placed in the patient's mouth and simultaneous impressions made, after which the upper and lower tray members will be applied to the occlusal plate 58 of a dental modeling articulator, preferably of the type shown in Patent No. 2,608,762. The extensions 20 and 26 will be clamped to the plate 58 by any suitable means, such as the clamp 60. The extensions 20 and 26 will further be connected together by the pins 32 so that the plates 10 and 22 will be positioned substantially identical to the construction that they had in the patient's mouth so that the impressions in the upper and lower gums will be in the identical position in which they were obtained in the patient's mouth. The articulator arm 62 will be permitted to move freely so that the impressions in the upper and lower trays will be applied to the molds 54 and 56, allowing the occlusal plate 58 to assume the desired position between the plates 50 and 52 so that the occlusal plate 58 will attain the position of the horizontal occlusal plane in the patient's mouth. After the plates 52 and 58 are properly aligned with respect to each other, the articulator will be properly tightened, after which the plates 10 and 22 will be removed and artificial gum 66 may be applied to the mold 56 and artificial dentures 68 applied thereon and extending against the occlusal plate 58 so that the dentures on the artificial gums 66 will be in the proper position of the original teeth in the patient's mouth.

After the upper dentures have been provided, the plate 58 will be removed, and a lower gum 70 will be applied to the mold 54 and dentures 72 provided thereon in meeting arrangement with the dentures 68 of the upper gum 66.

Since the impressions were coordinated with respect to each other and with respect to the patient's facial characteristics, the artificial dentures will be placed on the gums of the patient, and since they would meet in the construction, they will meet in the patient's mouth so that the teeth will operate naturally therein.

After the completed dentures have been constructed, the plates 50 and 52 are applied in the usual curing furnaces so that the artificial dentures may be properly cured before applied to the patient's mouth.

It will thus be apparent that the present invention provides a means for securing properly orientated impressions of the upper and lower portions of a patient's mouth so that the artificial dentures may be properly oriented with respect to each other so that when placed in the patient's mouth, they will properly meet for proper cutting and grinding action therein.

While for simplicity of illustration, a particular embodiment of the invention has been shown and described according to the best present understanding thereof, it will be apparent to those skilled in the art that changes and modifications in the construction and arrangement of the parts thereof may be readily made without departing from the true spirit and scope of the invention.

What is claimed as new is as follows:

For use with a dental articulator having an adjustable occlusal plate a composite articulator tray for transforming an occlusal plane from a patient's mouth to the adjustable occlusal plate, said tray comprising upper and lower impression trays, said upper tray including a flat plate member adapted to fit within the mouth of a patient, an upstanding rim on said plate adapted to be positioned between the lip and cheeks and the gum of a patient, said plate being adapted to retain an impression receiving material, said lower tray including a flat plate member, said lower flat plate member being substantially U-shaped, depending U-shaped flanges at the inner and outer edges of said plate, said plates being adapted to be independently inserted in the mouth of a patient, flat extension members on said plates, apertures in one of said extension members pins attached to other of said extension members extending into said apertures operable to rigidly lock said plates together both in the patient's mouth and on the occlusal plate.

References Cited in the file of this patent

UNITED STATES PATENTS

| Number | Name | Date |
|---|---|---|
| 730,658 | Huber | June 9, 1903 |
| 984,796 | Burnett | Feb. 21, 1911 |
| 2,153,710 | Coble | Apr. 11, 1939 |